(12) United States Patent
Yoshikawa et al.

(10) Patent No.: US 9,061,684 B2
(45) Date of Patent: Jun. 23, 2015

(54) CONTROL DEVICE OF HYBRID VEHICLE

(75) Inventors: Masato Yoshikawa, Susono (JP); Naoki Nakanishi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 13/980,413

(22) PCT Filed: Jan. 26, 2011

(86) PCT No.: PCT/JP2011/051527
§ 371 (c)(1),
(2), (4) Date: Jul. 18, 2013

(87) PCT Pub. No.: WO2012/101791
PCT Pub. Date: Aug. 2, 2012

(65) Prior Publication Data
US 2013/0304293 A1 Nov. 14, 2013

(51) Int. Cl.
| | |
|---|---|
| *B60L 11/00* | (2006.01) |
| *B60W 20/00* | (2006.01) |
| *B60K 6/48* | (2007.10) |
| *B60W 10/02* | (2006.01) |
| *B60W 10/06* | (2006.01) |
| *B60W 10/08* | (2006.01) |
| *B60W 30/20* | (2006.01) |

(52) U.S. Cl.
CPC ............ *B60W 20/40* (2013.01); *Y02T 10/6221* (2013.01); *Y02T 10/6286* (2013.01); *B60K 6/48* (2013.01); *B60W 10/02* (2013.01); *B60W 10/06* (2013.01); *B60W 10/08* (2013.01); *B60W 10/023* (2013.01); *B60W 30/20* (2013.01); *B60K 2006/4825* (2013.01); *B60W 2600/00* (2013.01); *Y10S 903/93* (2013.01); *Y02T 10/6252* (2013.01)

(58) Field of Classification Search
None
See application file for complete search history.

(56) References Cited

U.S. PATENT DOCUMENTS

| | | |
|---|---|---|
| 2003/0004031 A1 | 1/2003 | Philips et al. |
| 2007/0221421 A1 | 9/2007 | Tanishima |
| 2008/0071437 A1 | 3/2008 | Hirata et al. |
| 2010/0286858 A1 | 11/2010 | Otokawa |

FOREIGN PATENT DOCUMENTS

| | | |
|---|---|---|
| JP | A-2003-129878 | 5/2003 |
| JP | A 2004-56899 | 2/2004 |
| JP | A 2004-201408 | 7/2004 |
| JP | A-2007-83796 | 4/2007 |
| JP | A-2007-160991 | 6/2007 |
| JP | A-2007-253780 | 10/2007 |
| JP | A 2009-208700 | 9/2009 |

*Primary Examiner* — Thomas Tarcza
*Assistant Examiner* — Garrett Evans
(74) *Attorney, Agent, or Firm* — Oliff, PLC

(57) ABSTRACT

It is provided a control device of a hybrid vehicle including an engine and an electric motor as a drive power source for running, a clutch connecting/disconnecting a power transmission path between the engine and the electric motor, and an automatic transmission coupled to the electric motor in a power transmittable manner to transmit power from the drive power source for running toward drive wheels, the hybrid vehicle being configured to perform engine running using at least the engine as the drive power source for running with the clutch engaged and motor running using only the electric motor as the drive power source for running with the clutch released.

5 Claims, 5 Drawing Sheets

US 9,061,684 B2

CONTROL DEVICE OF HYBRID VEHICLE

TECHNICAL FIELD

The present invention relates to a control device of a hybrid vehicle including an engine, an electric motor coupling via a clutch to the engine, and an automatic transmission coupling to the electric motor.

BACKGROUND ART

A hybrid vehicle is well known that includes an engine and an electric motor as a drive power source for running, an engine connecting/disconnecting clutch connecting/disconnecting a power transmission path between the engine and the electric motor, and an automatic transmission coupled to the electric motor side to transmit the power from the drive power source for running toward drive wheels. For example, this corresponds to hybrid vehicles described in Patent Documents 1 to 3. Such a hybrid vehicle can generally perform engine running including the engine as the drive power source for running, i.e., hybrid running using at least the engine as the drive power source for running with the engine connecting/disconnecting clutch engaged, and motor running using only the electric motor as the drive power source for running with the engine connecting/disconnecting clutch released. Therefore, switching from the engine running (hybrid running) to the motor running may cause an uncomfortable feeling associated with release of the engine connecting/disconnecting clutch. In this regard, as described in Patent Documents 1 to 3, various control methods are proposed for transition from the hybrid running to the motor running without an uncomfortable feeling. For example, Patent Document 3 proposes that a change in torque associated with release of the engine connecting/disconnecting clutch is compensated by an output torque of an electric motor (electric motor torque) during transition from the hybrid running to the motor running.

For transition from the hybrid running to the motor running without an uncomfortable feeling, for example, it is conceivable that a decrease in a clutch passing torque (i.e., a passing torque that is an engine torque passing through the engine connecting/disconnecting clutch toward an automatic transmission) associated with release of the engine connecting/disconnecting clutch is compensated by an electric motor torque to achieve a target value of a transmission input torque (synonymous with a drive torque in this case) set depending on an accelerator operation. In other words, it is conceivable that the electric motor torque (=target transmission input torque−clutch passing torque) is set so as to realize the target transmission input torque.

PRIOR ART DOCUMENTS

Patent Documents

Patent Document 1: Japanese Laid-Open Patent Publication No. 2003-129878
Patent Document 2: Japanese Laid-Open Patent Publication No. 2007-253780
Patent Document 3: Japanese Laid-Open Patent Publication No. 2007-160991

SUMMARY OF THE INVENTION

Problem to Be Solved by the Invention

In the compensation control with the electric motor torque, for example, the clutch passing torque is calculated based on an estimate value of an engine connecting/disconnecting clutch torque corresponding to a clutch pressure command value. Therefore, if an actual value of the clutch passing torque associated with release of the engine connecting/disconnecting clutch decreases earlier than the estimate value due to variation etc., the actual value of the transmission input torque becomes smaller than the target value and, when the target value of the transmission input torque is lowered, the actual value may decrease at a steeper gradient.

FIG. 5 is a time chart for explaining a conventional example of providing the compensation control with the electric motor torque in association with transition from the hybrid running to the motor running when a target value of the transmission input torque is gradually reduced in accordance with an accelerator returning operation from the driving side putting a vehicle state (drive system) into a driving state to the driven side putting the drive system into a driven state. In FIG. 5, the electric motor torque is controlled based on an estimate value (solid line) of the clutch passing torque so as to realize a target value (solid line) of the transmission input torque. In this case, the clutch passing torque is estimated to gradually decrease toward zero from time t3; however, the clutch passing torque may gradually decrease from an earlier time point (e.g., time t2) than the estimation due to variation etc. Therefore, in a release transient process when the engine connecting/disconnecting clutch is actually released, an actual value (broken line) of the transmission input torque is smaller than the target value and decreases at a steeper gradient. This may increase abnormal noise or shock due to rattling when a switching region from the driving state to the driven state is passed, for example, abrupt change in vehicle deceleration (rattling shock) and tooth-hitting noise (rattling noise) associated with tooth-hitting (rattling) generated because a gap (backlash) in a meshing portion between gears in the drive system (e.g., an output shaft and a differential gear) on the output side of the automatic transmission is changed from a closed state on the driving side to a closed state on the driven state (see a portion B of FIG. 5). The problem described above is not known and no proposal has been made on giving consideration to rattling associated with switching from the driving state to the driven state if an actual value of a clutch torque decreases earlier than an estimate value in the case of employing the compensation control with the electric motor torque using the estimate value of the clutch torque at the time of transition from the hybrid running to the motor running.

The present invention was conceived in view of the situations and it is therefore an object of the present invention to provide a control device of a hybrid vehicle capable of suppressing rattling noise and rattling shock when a transition is made from the driving state to the driven state at the time of switching from the engine running to the motor running.

Means for Solving the Problem

To achieve the object, the first aspect of the invention provides (a) a control device of a hybrid vehicle including an engine and an electric motor as a drive power source for running, a clutch connecting/disconnecting a power transmission path between the engine and the electric motor, and an automatic transmission coupled to the electric motor in a power transmittable manner to transmit power from the drive power source for running toward drive wheels, the hybrid vehicle being configured to perform engine running using at least the engine as the drive power source for running with the clutch engaged and motor running using only the electric motor as the drive power source for running with the clutch released, wherein (b) when the engine running is switched to the motor running, if a transition is made from a driving state in which a drive torque is a positive torque to a driven state in which the drive torque is a negative torque, the transition to the driven state is made before the clutch is put into a slip state.

Effects of the Invention

Consequently, when the engine running is switched to the motor running, if a transition is made from a driving state in which a drive torque is a positive torque to a driven state in which the drive torque is a negative torque, the transition to the driven state is made before the clutch is put into a slip state and, therefore, when the clutch is put into the slip state and a passing torque that passes through the clutch decreases, the drive system is already put into the driven state. That is, a gap in a meshing portion between gears in the drive system is changed to the closed state on the driven side. Thus, even if the passing torque is reduced earlier than assumed and the drive torque is reduced at a steeper gradient, the rattling noise and the rattling shock are not generated. Since the clutch is still in the engaged state when the transition is made from the driving state to the driven state, an output torque of the electric motor is accurately slowly changed when the drive torque is changed from a positive torque to a negative torque, as compared to the case of slowly changing the output torque of the electric motor while the clutch is put into the slip state. Therefore, the rattling noise and the rattling shock can be suppressed.

The second aspect of the invention provides the control device of the hybrid vehicle recited in the first aspect of the invention, wherein an output torque of the electric motor is controlled based on an estimate value of a passing torque so as to realize a target value of a combined torque of the passing torque and the output torque of the electric motor, wherein the passing torque is an output torque of the engine passing through the clutch toward the automatic transmission, and wherein, the target value of the combined torque is set to a torque causing a transition to the driven state before the cultch is put into the slip state. Consequently, the transition can properly be made from the driving state to the driven state with the output torque of the electric motor that can relatively accurately be estimated, before the clutch is put into the slip state.

The third aspect of the invention provides the control device of the hybrid vehicle recited in the first or second aspect of the invention, wherein the output torque of the engine is maintained at a positive torque in a release transient process of releasing the clutch. Consequently, if the output torque of the engine is a negative torque in the release transient process of the clutch, while an increase in the a passing torque that passes through the clutch toward an automatic transmission (i.e., a reduction in the negative torque) may cause a transition of the drive system again from the driven state to the driving state, the transition is prevented from occurring again by maintaining the output torque of the engine at the positive torque. Therefore, the rattling noise and the rattling shock can be prevented from occurring due to the transition from the driven state to the driving state.

The fourth aspect of the invention provides the control device of the hybrid vehicle recited in any one of inventions the first to third aspects of the invention, wherein the output torque of the electric motor is controlled to maintain the driven state in a release transient process of releasing the clutch. Consequently, even if the passing torque that passes through the clutch varies differently from the assumption, the transition of the drive system is prevented from occurring again from the driven state to the driving state. Therefore, the rattling noise and the rattling shock can be prevented from occurring due to the transition from the driven state to the driving state.

The fifth aspect of the invention provides the control device of the hybrid vehicle recited in the second aspect of the invention, wherein if the passing torque turns to a negative torque, the control device cancels controlling to make a transition to the driven state before the clutch is put into the slip state. As a result, while the provision of the control may increase the passing torque that passes through the clutch toward an automatic transmission (i.e., reduce the negative torque) and cause a new problem of making a transition of the drive system again from the driven state to the driving state, the occurrence of the new problem is avoided because the control is not provided.

MODES FOR CARRYING OUT THE INVENTION

Figure 1:
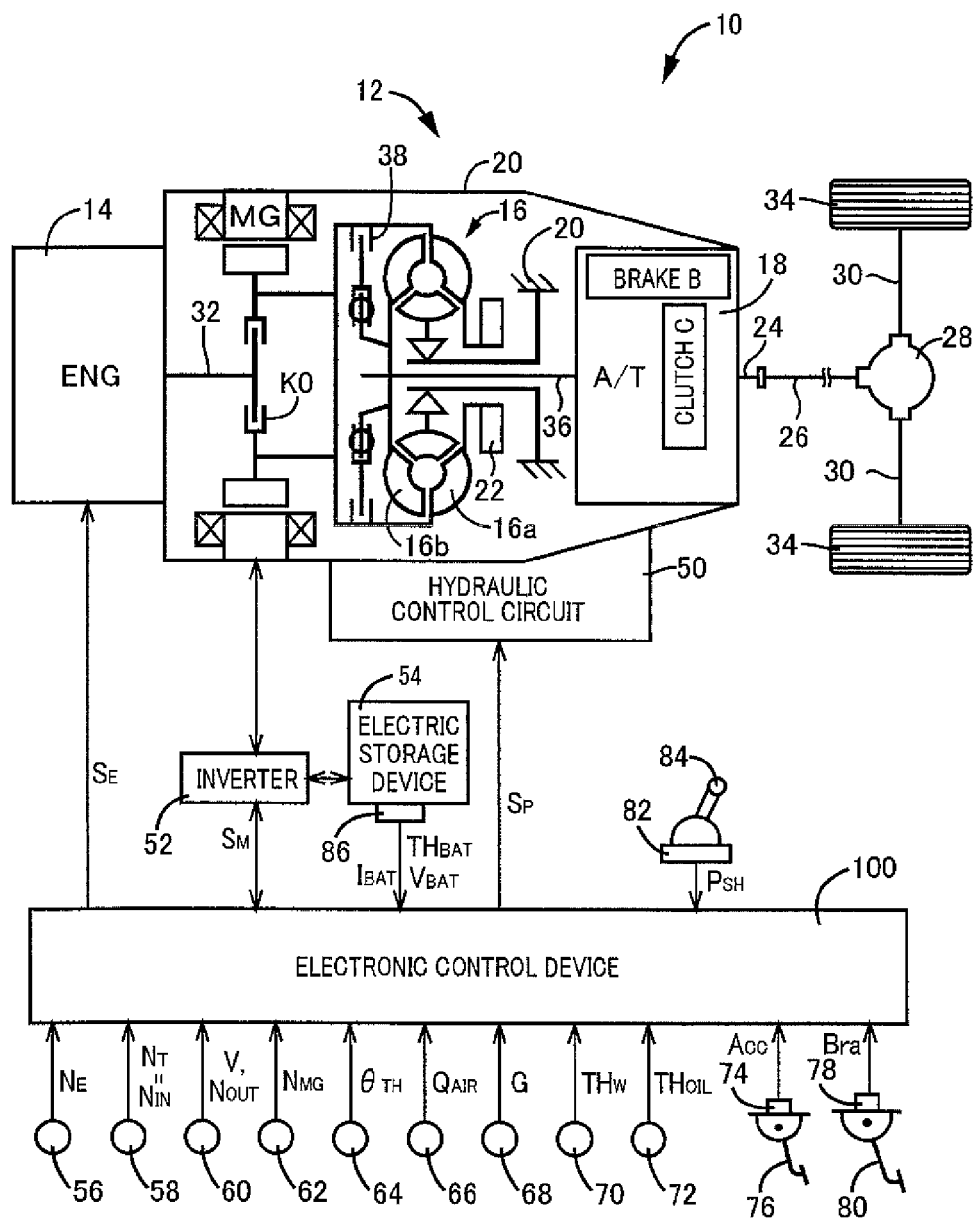
FIG. 1 is a diagram for explaining a general configuration of a power transmission path making up a hybrid vehicle to which the present invention is applied, and is a diagram for explaining a main portion of a control system disposed in the vehicle.

In the present invention, preferably, the automatic transmission is made up of a stand-alone transmission, a transmission having a hydraulic transmission device such as a torque converter, or a transmission having a sub-transmission. This transmission is made up of various planetary gear automatic transmissions having, for example, four forward speeds, five forward speeds, six forward speeds, or more shift stages with a plurality of sets of rotating elements (rotating members) of a planetary gear device selectively coupled by engagement devices to achieve a plurality of gear stages (shift stages) in an alternative manner; a synchronous meshing type parallel two-shaft automatic transmission that is a synchronous meshing type parallel two-shaft transmission including pairs of always meshing change gears between two shafts to put any of the pairs of the change gears into a power transmission state by a synchronizing device in an alternative manner and that has shift stages capable of being automatically switched by the synchronizing device driven by a hydraulic actuator; a so-called DCT (Dual Clutch Transmission) that is a synchronous meshing type parallel two-shaft automatic transmission and that is a transmission of a type having two systems of input shafts with clutches respectively linked to the input shafts of the systems and further respectively linked to even stages and odd stages; a so-called belt type continuously variable transmission having a transmission belt acting as a power transmission member wrapped around a pair of variable pulleys having a variable effective diameter so as to continuously vary a gear ratio in a stepless manner; a so-called traction type continuously variable transmission having a pair of cones rotated around a common shaft center and a plurality of rollers capable of rotating around a rotation center intersecting with the shaft center such that the rollers are interposed and pressed between the pair of the cones to change an intersection angle between the rotation center of the rollers and the shaft center so as to vary a gear ratio, etc.

Preferably, engagement devices such as multi-plate and single-plate clutches and brakes engaged by a hydraulic actuator or belt type brakes are widely used for the engagement devices of the planetary gear automatic transmission. Although an oil pump supplying operating oil for actuating the engagement devices may be an oil pump driven by, for example, a drive power source for running to discharge the operating oil, the oil pump may be driven by a dedicated electric motor etc., disposed separately from the drive power source for running.

Preferably, it is desirable in terms of responsiveness that a hydraulic control circuit including the engagement devices directly supplies, for example, an output oil pressure of a linear solenoid valve to each of hydraulic actuators (hydraulic cylinders) of the engagement devices; however, the output oil pressure of the linear solenoid valve can be used as a pilot oil pressure to control a shift control valve such that the operating oil is supplied from the control valve to the hydraulic actuators.

Preferably, the linear solenoid valves are disposed in one-to-one correspondence to each of a plurality of engagement devices, for example; however various other forms are available and, for example, if a plurality of the engagement devices exists that are not engaged or subjected to the engage/release control at the same time, a linear solenoid valve common to these devices can be disposed. The hydraulic control of all the engagement devices may not necessarily be provided by the linear solenoid valves, and the hydraulic control may partially or entirely be provided by a hydraulic pressure adjusting means other than the linear solenoid valves such as duty control of an ON-OFF solenoid valve. The phrase "supplying oil pressure" as used herein means that "causing oil pressure to act on" or "supplying operating oil controlled to the oil pressure".

Preferably, an internal combustion engine such as a gasoline engine and a diesel engine is widely used as the engine.

Preferably, a wet or dry engagement device is used as the clutch connecting/disconnecting the power transmission path between the engine and the electric motor.

An example of the present invention will now be described in detail with reference to the drawings.

Example

FIG. 1 is a diagram for explaining a general configuration of a power transmission path from an engine 14 to drive wheels 34 making up a hybrid vehicle 10 (hereinafter referred to as a vehicle 10) to which the present invention is applied, and is a diagram for explaining a main portion of a control system disposed in the vehicle 10 for output control of the engine 14 acting as a drive power source for running, shift control of an automatic transmission 18, drive control of an electric motor MG acting as a drive power source for running, etc.

In FIG. 1, a vehicle power transmission device 12 (hereinafter referred to as a power transmission device 12) includes, an engine connecting/disconnecting clutch K0, the electric motor MG, a torque converter 16, an oil pump 22, the automatic transmission 18, etc., in order from the engine 14 side in a transmission case 20 (hereinafter referred to as a case 20) acting as a non-rotating member attached to a vehicle body by bolts etc. The power transmission device 12 also includes a propeller shaft 26 coupled to an output shaft 24 that is an output rotating member of the automatic transmission 18, a differential gear device (differential gear) 28 coupled to the propeller shaft 26, a pair of axles 30 coupled to the differential gear device 28, etc. The power transmission device 12 configured as described above is preferably used in the vehicle 10 of the FR (front-engine rear-drive) type, for example. In the power transmission device 12, if the engine connecting/disconnecting clutch K0 is engaged, a power of the engine 14 is transmitted from an engine coupling shaft 32 coupling the engine 14 and the engine connecting/disconnecting clutch K0, sequentially through the engine connecting/disconnecting clutch K0, the torque converter 16, the automatic transmission 18, the propeller shaft 26, the differential gear device 28, a pair of the axles 30, etc., to a pair of the drive wheels 34.

The torque converter 16 is a hydraulic transmission device transmitting a drive power input to a pump impeller 16a via fluid toward the automatic transmission 18. The pump impeller 16a is coupled sequentially through the engine connecting/disconnecting clutch K0 and the engine coupling shaft 32 to the engine 14 and is an input-side rotating element receiving the input of the drive power from the engine 14 and rotatable around an axial center. A turbine impeller 16b of the torque converter 16 is an output-side rotating element of the torque converter 16 and is relatively non-rotatably coupled to a transmission input shaft 36 that is an input rotating member of the automatic transmission 18 by spline fitting, etc. The torque converter 16 includes a lockup clutch 38. The lockup clutch 38 is a direct clutch disposed between the pump impeller 16a and the turbine impeller 16b and is put into an engaged state, a slip state, or a released state by hydraulic control etc.

The electric motor MG is a so-called motor generator having a function of a motor generating a mechanical drive power from electric energy and a function of an, electric generator generating electric energy from mechanical energy. In other words, the electric motor MG may act as a drive power source for running generating a drive power for running instead of the engine 14 that is a power source or along with the engine 14. The electric motor MG also performs operations such as generating electric energy through regeneration from a drive power generated by the engine 14 or a driven power (mechanical energy) input from the drive wheels 34 side to accumulate the electric energy via an inverter 52 into an electric storage device 54. The electric motor MG is operatively coupled to the pump impeller 16a and power is mutually transmitted between the electric motor MG and the pump impeller 16a. Therefore, the electric motor MG is coupled to the transmission input shaft 36 in a power transmittable manner as is the case with the engine 14.

The oil pump 22 is a mechanical oil pump coupled to the pump impeller 16a and rotationally driven by the engine 14 (or the electric motor MG) to generate an operating oil pressure for providing the shift control of the automatic transmission 18, controlling a torque capacity of the lockup clutch 38, controlling engagement/release of the engine connecting/disconnecting clutch K0, and supplying lubricant oil to the portions of the power transmission path of the vehicle 10.

The engine connecting/disconnecting clutch K0 is a wet multi-plate type hydraulic friction engagement device in which a plurality of friction plates overlapped with each other is pressed by a hydraulic actuator, for example, and is subjected to engagement/release control by a hydraulic control circuit 50 disposed in the power transmission device 12 by using an oil pressure generated by the oil pump 22 as an original pressure. In the engagement/release control, a power-transmittable torque capacity of the engine connecting/disconnecting clutch K0, i.e., an engagement force of the engine connecting/disconnecting clutch K0 is varied, for example, continuously, through pressure adjustment of a linear solenoid valve etc., in the hydraulic control circuit 50. The engine connecting/disconnecting clutch K0 includes a pair of clutch rotating members (a clutch hub and a clutch drum) relatively rotatable in the released state thereof and one of the clutch rotating members (the clutch hub) is relatively non-rotatably coupled to the engine coupling shaft 32 while the other clutch rotating member (the clutch drum) is relatively non-rotatably coupled to the pump impeller 16a of the torque converter 16. Because of such a configuration, the engine connecting/disconnecting clutch K0 rotates the pump impeller 16a integrally with the engine 14 via the engine coupling shaft 32 in the engaged state. Therefore, in the engaged state of the engine connecting/disconnecting clutch K0, the drive power from the engine 14 is input to the pump impeller 16a. On the other hand, in the released state of the engine connecting/disconnecting clutch K0, the power transmission between the pump impeller 16a and the engine 14 is interrupted. As described above, since the electric motor MG is operatively coupled to the pump impeller 16a, the engine connecting/disconnecting clutch K0 acts as a clutch connecting/disconnecting the power transmission path between the engine 14 and the electric motor MG.

The automatic transmission 18 is coupled to the electric motor MG without going through the engine connecting/disconnecting clutch K0 in a power transmittable manner and makes up a portion of the power transmission path from the engine 14 to the drive wheels 34 to transmit the power from the drive power source for running (the engine 14 and the electric motor MG) toward the drive wheels 34. The automatic transmission 18 is a planetary-gear type multistage transmission acting as a stepped automatic transmission shifted to selectively establish a plurality of shift stages (gear stages) by, for example, switching any of a plurality of engagement devices, for example, hydraulic friction engagement devices such as clutches C and brakes B, to be gripped (i.e., by engagement and release of the hydraulic friction engagement devices). Therefore, the automatic transmission 18 is, for example, a stepped transmission executing a so-called clutch-to-clutch shift frequently used in known vehicles and changes the speed of the rotation of the transmission input shaft 36 to output the rotation from the output shaft 24. The transmission input shaft 36 is a turbine shaft rotationally driven by the turbine impeller 16b of the torque converter 16. In the automatic transmission 18, the engagement/release control of each of the clutches C and the brakes B establishes a predetermined gear stage (shift stage) depending on accelerator operation of a driver, a vehicle speed V, etc.

The clutches C and brakes B are hydraulic friction engagement devices frequently used in known vehicle automatic transmissions and are made up of wet multi-plate type clutches and brakes pressed by hydraulic actuators, a band brake fastened by a hydraulic actuator, etc. The clutches C and the brakes B configured as described above are subjected to the engagement/release control by the hydraulic control circuit 50 such that respective torque capacities, i.e., engagement forces are varied, for example, continuously, through pressure adjustment of a linear solenoid valve etc., in the hydraulic control circuit 50, thereby selectively coupling members on the both sides of the engagement devices interposed therebetween.

A torque capacity of an engagement device is determined by, for example, a friction coefficient of a friction material of the engagement device and an engagement oil pressure pressing friction plates and, to transmit a vehicle request torque that is a request torque for the vehicle 10 at the drive wheels 34 (from another viewpoint, a transmission input torque $T_{AT}$ that is a torque on the transmission input shaft 36) without a slip of the engagement device, a torque capacity is required that is equal to or greater than an assigned torque of the engagement device for the transmission input torque $T_{AT}$. In this example, a torque capacity of an engagement device may be used synonymously with an engagement oil pressure for convenience. A transmission torque capacity in the automatic transmission 18 is defined as a value acquired by converting a torque capacity of an engagement device into the torque on the transmission input shaft 36. Therefore, if a shift stage is formed by engagement of a plurality of engagement devices, the transmission torque capacity in the automatic transmission 18 is defined as a value acquired by converting a combined torque of the torque capacities of the engagement devices into the torque on the transmission input shaft 36.

Returning to FIG. 1, the vehicle 10 includes an electronic control device 100 including a control device related to ae hybrid drive control, for example. The electronic control device 100 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 100 provides the output control of the engine 14, the drive control of the electric motor MG including the regenerative control of the electric motor MG the shift control of the automatic transmission 18, the torque capacity control of the lockup clutch 38, the torque capacity control of the engine connecting/disconnecting clutch K0, etc., and is configured separately as needed for the engine control, the electric motor control, the hydraulic control (the shift control), etc.

The electronic control device 100 is supplied with, for example, a signal indicative of an engine rotation speed $N_E$ that is the rotation speed of the engine 14 detected by an engine rotation speed sensor 56; a signal indicative of a turbine rotation speed $N_T$ of the torque converter 16 as an input rotation speed of the automatic transmission 18 detected by a turbine rotation speed sensor 58, i.e., a transmission input rotation speed $N_{IN}$ that is the rotation speed of the transmission input shaft 36; a signal indicative of a transmission output rotation speed $N_{OUT}$ that is the rotation speed of the output shaft 24 corresponding to the vehicle speed V or a rotation speed of the propeller shaft 26 as a vehicle speed related value detected by an output shaft rotation speed sensor 60; a signal indicative of an electric motor rotation speed $N_{MG}$ that is the rotation speed of the electric motor MG detected by an electric motor rotation speed sensor 62; a signal indicative of a throttle valve opening degree $\theta_{TH}$ that is an opening degree of an electronic throttle valve not depicted detected by a throttle sensor 64; a signal indicative of an intake air amount $Q_{AIR}$ of the engine 14 detected by an intake air amount sensor 66; a signal indicative of longitudinal acceleration G (or longitudinal deceleration G) of the vehicle 10 detected by an acceleration sensor 68; a signal indicative of a cooling water temperature $TH_W$ of the engine 14 detected by a cooling water temperature sensor 70; a signal indicative of an oil temperature $TH_{OIL}$ of the operating oil in the hydraulic control circuit 50 detected by an oil temperature sensor 72; a signal indicative of an accelerator opening degree Acc that is an operation amount of an accelerator pedal 76 as a drive power request amount (driver request output) for the vehicle 10 from a driver detected by an accelerator opening degree sensor 74; a signal indicative of a brake operation amount Bra that is an operation amount of a brake pedal 80 as a braking power request amount (driver request deceleration) for the vehicle 10 from a driver detected by a foot brake sensor 78; a signal indicative of a lever position (shift operation position, shift position, operation position) $P_{SH}$ of a shift lever 84, such as known "P", "N", "D", "R", and "S" positions, detected by a shift position sensor 82; and signals indicative of a battery temperature $TH_{BAT}$, a battery input/output current (battery charging/discharging current) $I_{BAT}$, and a battery voltage $V_{BAT}$ of the electric storage device 54 detected by a battery sensor 86. The electronic control device 100 sequentially calculates a state of charge (charging capacity) SOC of the electric storage device 54 based on the battery temperature $TH_{BAT}$, the battery charging/discharging current $I_{BAT}$, and the battery voltage $V_{BAT}$, for example.

The electronic control device 100 outputs, for example, an engine output control command signal $S_E$ for the output control of the engine 14; an electric motor control command signal $S_M$ for controlling the operation of the electric motor MG; and an oil pressure command signal $S_P$ for actuating electromagnetic valves (solenoid valves) included in the hydraulic control circuit 50 for controlling the hydraulic actuators of the engine connecting/disconnecting clutch K0 and the clutches C and the brakes B of the automatic transmission 18.

Figure 2:
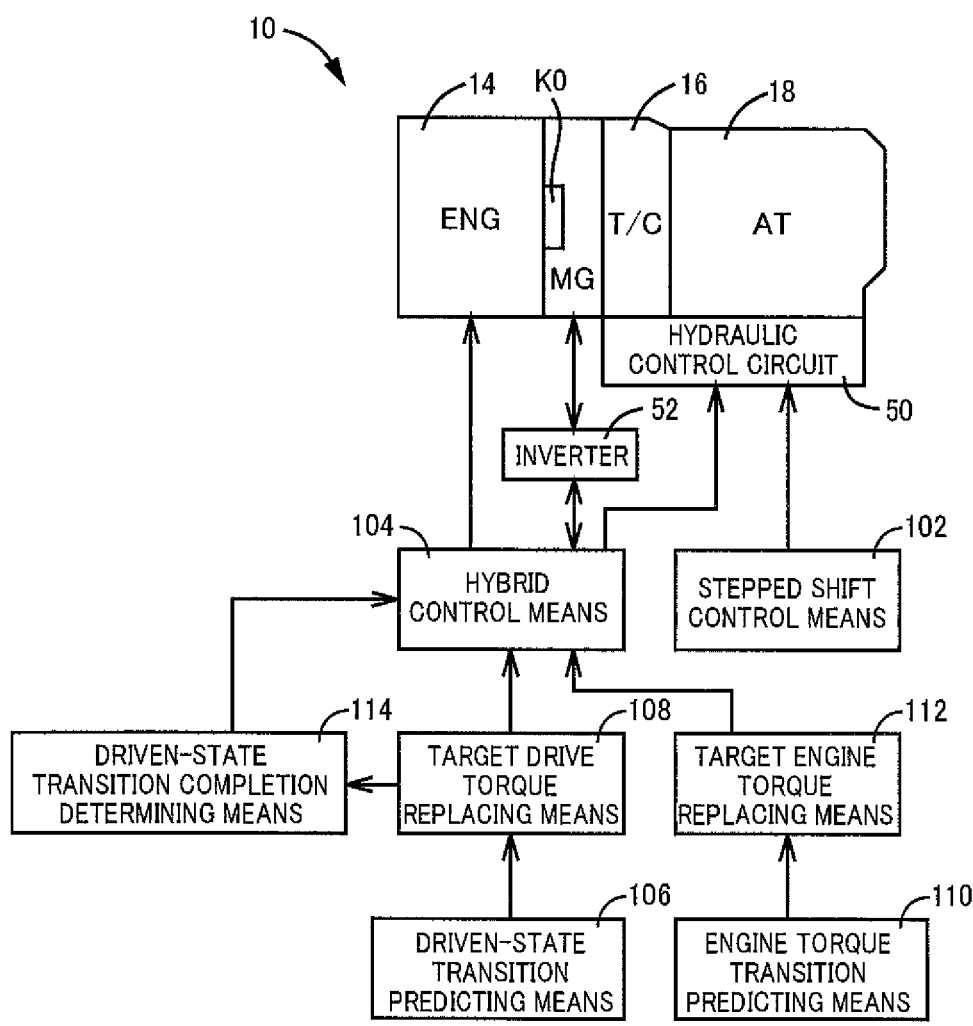
FIG. 2 is a functional block diagram for explaining a main portion of the control function of the electronic control device.

FIG. 2 is a functional block diagram for explaining a main portion of the control function of the electronic control device 100. In FIG. 2, a stepped shift control portion, i.e., a stepped shift control means 102 acts as a shift control means performing a shift of the automatic transmission 18. For example, the stepped shift control means 102 determines whether a shift of the automatic transmission 18 should be performed, i.e., determines a shift stage to be achieved by the automatic transmission 18, based on a vehicle state indicated by an actual vehicle speed V and the actual accelerator opening degree Acc from known relationship (shift diagram, shift map) having upshift lines and downshift lines stored in advance by using the vehicle speed V and the accelerator opening degree Acc (or transmission output torque $T_{OUT}$ etc.,) as variables, and provides automatic shift control of the automatic transmission 18 such that the determined shift stage is acquired. For example, if the accelerator opening degree Acc (vehicle request torque) exceeds the downshift line to be a higher accelerator opening degree (higher vehicle request torque) in association with an increase in the accelerator opening degree Acc due to an additional depression operation of the accelerator pedal 76, the stepped shift control means 102 determines that a downshift request for the automatic transmission 18 is made, and provides the downshift control of the automatic transmission 18 corresponding to the downshift line. In this case, the stepped shift control means 102 outputs to the hydraulic control circuit 50 a command (shift output command, oil pressure command) $S_P$ causing engagement and/or release of the engagement devices involved with the shift of the automatic transmission 18 such that the shift stage is achieved in accordance with a predetermined engagement operation table stored in advance, for example. The hydraulic control circuit 50 actuates the linear solenoid valves in the hydraulic control circuit 50 to actuate the hydraulic actuators of the engagement devices involved with the shift such that the shift of the automatic transmission 18 is performed by, for example, releasing a release-side engagement device (release-side clutch) and engaging an engagement-side engagement device (engagement-side clutch) in accordance with the command $S_P$.

A hybrid control portion, i.e., a hybrid control means 104 has a function as an engine drive control means controlling the drive of the engine 14 and a function as an electric motor operation control means controlling the operation of the electric motor MG as a drive power source or an electric generator through the inverter 52, and provides control of the hybrid drive by the engine 14 and the electric motor MG etc., through these control functions. For example, the hybrid control means 104 calculates a vehicle request torque, i.e., a target value of a drive torque $T_D$ (target drive torque $T_D^*$) that is a torque on the axles 30 (output torque at the drive wheels 34) based on the accelerator opening degree Acc and the vehicle speed V, calculates an output torque of the drive power source for running (the engine 14 and the electric motor MG), i.e., a target value of the transmission input torque $T_{AT}$ (target transmission input torque $T_{AT}^*$) such that the target drive torque $T_D^*$ is acquired in consideration of a transmission loss, an accessory load, a shift stage of the automatic transmission 18, a charging capacity SOC of the electric storage device 54 (in other words, a charging/discharging request amount of the electric storage device 54), etc., and controls the drive power source for running so as to achieve the target transmission input torque $T_{AT}^*$.

Although the transmission input torque $T_{AT}$ is the output torque of the torque converter 16 and has a difference corresponding to a torque ratio in the torque converter 16 from the input torque of the torque converter 16, the torque ratio is assumed to be one in this example for convenience and the transmission input torque $T_{AT}$ is considered as the same as the input torque of the torque converter 16. The transmission input torque $T_{AT}$ is a combined torque ($=T_{E/K0}+T_{MG}$) of a passing torque that is an output torque (engine torque) $T_E$ of the engine 14 passing through the engine connecting/disconnecting clutch K0 toward the automatic transmission 18 (hereinafter referred to as K0-passing torque $T_{E/K0}$) and an output torque (electric motor torque) $T_{MG}$ of the electric motor MG. When the drive torque $T_D$ is a positive torque, the vehicle state is the driving state in which the engine 14 side rotationally drives the drive wheel 34 side and when the drive torque $T_D$ is a negative torque, the vehicle state is the driven state in which the drive wheel 34 side rotationally drives the engine 14 side (electric motor MG side). The drive torque $T_D$ can obviously be converted into the transmission input torque $T_{AT}$ and can also be converted into the transmission output torque $T_{OUT}$, which is a torque on the output shaft 24, and an input torque of the power transmission, device 12 (system shaft torque), which is a torque input to the pump impeller 16a. Therefore, a target value of the transmission output torque $T_{OUT}$, the transmission input torque $T_{AT}$, the input torque of the power transmission device 12, etc., or the accelerator opening degree Acc, the throttle valve opening degree $\theta_{TH}$, the intake air amount $Q_{AIR}$, etc., are usable as the target drive torque $T_D^*$, in addition to the target value of the drive torque $T_D$.

More specifically, for example, if the target drive torque $T_D^*$ (target transmission input torque $T_{AT}^*$) is within a range that can be covered by only an electric motor torque $T_{MG}$, the hybrid control means 104 sets the running mode to a motor running mode (hereinafter, EV mode) and performs a motor running (EV running) using only the electric motor MG as the drive power source for running. On the other hand, for example, if the target drive torque $T_D^*$ is within a range that cannot be covered unless at least the engine torque $T_E$ is used, the hybrid control means 104 sets the running mode to an engine running mode, i.e., a hybrid running mode (hereinafter, HV mode) and performs the engine running, i.e., a hybrid running (HV running) using at least the engine 14 as the drive power source for running.

If the HV running is performed, the hybrid control means 104 engages the engine connecting/disconnecting clutch K0 to transmit the drive power from the engine 14 to the pump impeller 16a and causes the electric motor MG to output an assist torque as needed. On the other hand, if the EV running is performed, the hybrid control means 104 releases the engine connecting/disconnecting clutch K0 to interrupt the power transmission path between the engine 14 and the torque converter 16 and causes the electric motor MG to output the electric motor torque $_{MG}$ required for the motor running.

If the target drive torque $T_D^*$ is increased due to the additional depression operation of the accelerator pedal 76 during the EV running and the target transmission input torque $T_{AT}^*$ corresponding to the target drive torque $T_D^*$ exceeds a predetermined EV running torque range obtained and defined in advance as torque that can be accommodated by the electric motor torque$_{MG}$, the hybrid control means 104 switches the running mode from the EV mode to the HV mode and starts the engine 14 to perform the HV running. At this start of the engine 14, while engaging the engine connecting/disconnecting clutch K0 toward the complete engagement, the hybrid control means 104 rotationally drives the engine 14 by transmitting an engine start torque $T_{MG}S$ for engine start from the electric motor MG via the engine connecting/disconnecting clutch K0 and starts the engine 14 by controlling engine ignition, fuel supply, etc., while the engine rotation speed $N_E$ is,raised to a predetermined rotation or higher. After the engine 14 is started, the hybrid control means 104 promptly achieves the complete engagement of the engine connecting/disconnecting clutch K0.

On the other hand, if the target drive torque $T_D^*$ is reduced due to an depression returning operation of the accelerator pedal 76 during the HV running and the target transmission input torque $T_{AT}^*$ falls within the predetermined EV running torque range, the hybrid control means 104 switches the running mode from the HV mode to the EV mode and stops the engine 14 to perform the EV running (see before and after time t1 of FIG. 4 described later). When the engine 14 is stopped in this case, the hybrid control means 104 control the electric motor torque $T_{MG}$ (=$T_{AT}^*$-$T_{E/K0}$) so as to realize the target transmission input torque $T_{AT}^*$ while putting the engine connecting/disconnecting clutch K0 into slip engagement toward release. Therefore, the hybrid control means 104 provides the compensation control compensating a decrease in the K0-passing torque $T_{E/K0}$ associated with release of the engine connecting/disconnecting clutch K0 with the electric motor torque $T_{MG}$ so as to achieve the target transmission input torque $T_{AT}^*$. After the release of the engine connecting/disconnecting clutch K0, the hybrid control means 104 performs a fuel cut of the engine 14 to stop the engine 14. In the compensation control with the electric motor torque $T_{MG}$, the K0-passing torque $T_{E/K0}$ is calculated as an estimate value (estimate K0-passing torque $T_{E/K0}$') based on an estimate value of a torque capacity (K0-clutch torque) $T_{K0}$ of the engine connecting/disconnecting clutch K0 and an estimate value of the engine torque $T_E$, for example. The estimate value of the K0-clutch torque $T_{K0}$ is calculated based on the oil pressure command signal (clutch pressure command signal) $S_P$ for controlling the operation of the engine connecting/disconnecting clutch K0. The estimate value of the engine torque $T_E$ is calculated based on an actual engine rotation speed $N_E$ and an engine load from a known relationship (engine torque map) defined in advance between the engine rotation speed $N_E$ and the estimate value of the engine torque $T_E$ by using an engine load such as a throttle valve opening degree $\theta_{TH}$ as a parameter, for example.

Figure 5:
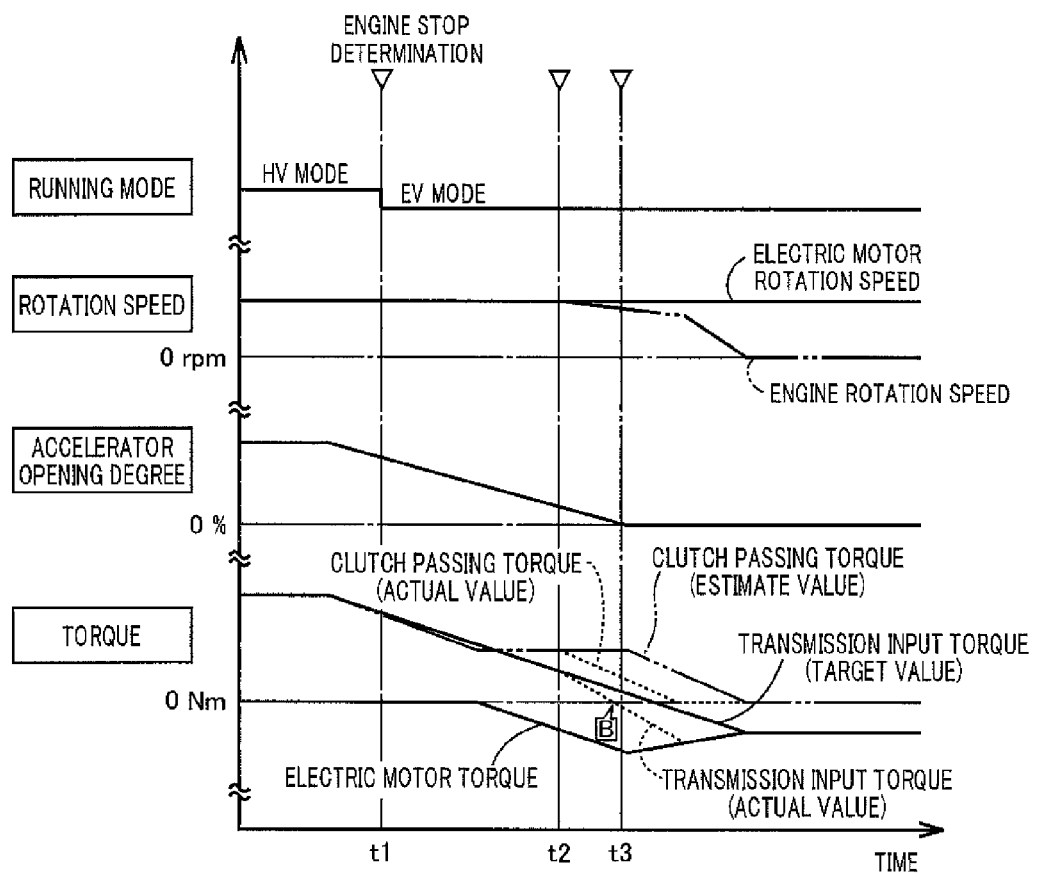
FIG. 5 is a time chart for explaining a conventional example of providing the compensation control with the electric motor torque in association with transition from the hybrid running to the motor running when a target value of the transmission input torque is gradually reduced from the driving side to the driven side.

Discussion will be made on the case that the depression returning operation of the accelerator pedal 76 during the HV running (e.g., operation toward turning off of acceleration) reduces the target drive torque $T_D^*$ from a positive torque (the driving side) toward a negative torque (the driven side), causing a transition of the vehicle state from the driving state to the driven state. In such a case, as described above, the HV mode (HV running) is switched to the EV mode (EV running). As depicted in a conventional example of FIG. 5, the hybrid control means 104 reduces the K0-clutch torque $T_{K0}$ to a predetermined torque capacity at a level not putting the engine connecting/disconnecting clutch K0 into the slip state as needed for constant-pressure standby so as not to delay the release of the engine connecting/disconnecting clutch K0. Therefore, the transition of the engine connecting/disconnecting clutch K0 to the slip state may be made earlier due to individual variations of the engine connecting/disconnecting clutch K0, the hydraulic control circuit 50, etc., and an actual value of the K0-passing torque $T_{E/K0}$ (actual K0-passing torque $T_{E/K0}$) may gradually decrease earlier than the estimate K0-passing torque $T_{E/K0}$'. In this case, for the electric motor torque $T_{MG}$, a setting value (=$T_{AT}^*$-$T_{E/K0}$') is calculated based on the estimate K0-passing torque $T_{E/K0}$' so as to realize the target transmission input torque $T_{AT}^*$. Therefore, in a release transient process of the engine connecting/disconnecting clutch K0 while the actual K0-passing torque $T_{E/K0}$ gradually decreases earlier than the estimate K0-passing torque $T_{E/K0}$', an actual value of the transmission input torque $T_{AT}$ (actual transmission input torque $T_{AT}$) is reduced at a steeper gradient than the target transmission input torque $T_{AT}^*$. This may increase rattling shock and rattling noise associated with rattling in the drive system (e.g., the output shaft 24 and the differential gear 28) on the output side of the automatic transmission 18 when a switching region from the driving state to the driven state is passed, for example (see a portion B of FIG. 5).

Therefore, when switching the HV running to the EV running, if a transition of the vehicle state (drive system) is made from the driving state to the driven state, the electronic control device 100 of this example makes a transition of the vehicle state to the driven state (i.e., completes the transition to the driven state) before the engine connecting/disconnecting clutch K0 is actually put into the slip state. For example, when switching the HV running to the EV running, if the target drive torque $T_D^*$ (target transmission input torque $T_{AT}^*$) is predicted to be a torque causing a transition of the vehicle state from the driving state to the driven state, the electronic control device 100 sets the target drive torque $T_D^*$ to the torque causing a transition of the vehicle state to the driven state before the engine connecting/disconnecting clutch K0 is actually put into the slip state. In other words, when switching the HV running to the EV running, if the target drive torque $T_D^*$ is predicted to be a torque causing a transition of the vehicle state from the driving state to the driven state, the electronic control device 100 replaces the target drive torque $T_D^*$ at the time of prediction with a new target drive torque $T_D^*$ causing a transition of the vehicle state to the driven state before the engine connecting/disconnecting clutch K0 is actually put into the slip state. This is for the purpose of preventing the rattling noise and the rattling shock by putting the vehicle state into the driven state in advance even when the actual K0-passing torque $T_{E/K0}$ gradually decreases earlier than the estimate K0-passing torque $T_{E/K0}'$ and the actual drive torque $T_D$ (actual transmission input torque $T_{AT}$) is reduced at a steeper gradient than the target drive torque $T_D^*$ (target transmission input torque $T_{AT}^*$). This is also for the purpose of preventing the rattling noise and the rattling shock by causing a transition of the vehicle state from the driving state to the driven state when the engine connecting/disconnecting clutch K0 is still in the engaged state to accurately make a slow change with the electric motor torque $T_{MG}$ in accordance with the target drive torque $T_D^*$ as compared to when the engine connecting/disconnecting clutch K0 is in the slip state.

If the engine torque $T_E$ is a negative torque in the release transient process of actually putting the engine connecting/disconnecting clutch K0 into the slip state after the vehicle state is put into the driven state, a reduction in the negative torque (i.e., an increase in the K0-passing torque $T_{E/K0}$) may cause a transition of the vehicle state again from the driven state to the driving state. As a result, the rattling noise and the rattling shock may occur in association with the transition from the driven state to the driving state. Therefore, the electronic control device 100 of this example maintains the engine torque $T_E$ at a positive torque during the release transient process of releasing the engine connecting/disconnecting clutch K0.

If the actual K0-passing torque $T_{E/K0}$ gradually decreases later than the estimate K0-passing torque $T_{E/K0}'$ in the release transient process of actually putting the engine connecting/disconnecting clutch K0 into the slip state after the vehicle state is put into the driven state, the actual drive torque $T_D$ may increase greater than the replaced target drive torque $T_D^*$, causing a transition of the vehicle state again from the driven state to the driving state. As a result, the rattling noise and the rattling shock may occur in association with the transition from the driven state to the driving state. Therefore, the electronic control device 100 of this example controls the electric motor torque $T_{MG}$ to maintain the vehicle state in the driven state in the release transient process of releasing the engine connecting/disconnecting clutch K0.

More specifically, the hybrid control means 104 determines whether a stop request for the engine 14 is made. For example, the hybrid control means 104 determines whether a stop request for the engine 14 is made, based on whether the target transmission input torque $T_{AT}^*$ corresponding to the target drive torque $T_D^*$ falls within the predetermined EV running torque range during the HV running. Alternatively, the hybrid control means 104 may determine whether a stop request for the engine 14 is made, based on whether the accelerator opening degree Acc becomes equal to or less than a predetermined accelerator opening degree obtained and defined in advance as an accelerator opening degree enabling the EV running, during the HV running.

A driven-state transition predicting portion, i.e., a driven-state transition predicting means 106 determines whether it is predicted that the target drive torque $T_D^*$ (target transmission input torque $T_{AT}^*$) subsequently reaches a torque causing a transition of the vehicle state from the driving state to the driven state. For example, the driven-state transition predicting means 106 determines that the transition to the driven state is predicted if the target transmission input torque $T_{AT}^*$ becomes lower than a prediction determination threshold value A. The prediction determination threshold value A is calculated based on the vehicle speed V, the gear stage of the automatic transmission 18, the oil temperature $TH_{OIL}$ of the operating oil, for example. Specifically, the prediction determination threshold value A is calculated based on the actual vehicle speed V from a relationship (map) not depicted in which the prediction determination threshold value A becomes larger when the vehicle speed V is higher. Alternatively, since a dragging loss in the automatic transmission 18 varies depending on a status of formation of a gear stage of the automatic transmission 18, the prediction determination threshold value A is calculated based on the actual gear stage from a relationship (map) reflecting the status. Alternatively, since it is considered that a lower oil temperature $TH_{OIL}$ of the operating oil makes the dragging in the automatic transmission 18 larger and facilitates an earlier transition to the driven side, the prediction determination threshold value A is calculated based on the actual oil temperature $TH_{OIL}$ from a relationship (map) not depicted in which the prediction determination threshold value A becomes larger when the oil temperature $TH_{OIL}$ is lower.

Instead of, or in addition to, the determination with the target transmission input torque $T_{AT}^*$, the driven-state transition predicting means 106 determines that the transition to the driven state is predicted if a decreasing gradient (decreasing rate) of the target transmission input torque $T_{AT}^*$ is equal to or greater than a predetermined prediction determination threshold value B obtained in advance for predicting a transition to the driven state, and/or, if a decreasing gradient (decreasing rate) of the accelerator opening degree Acc is equal to or greater than a predetermined prediction determination threshold value C obtained in advance for predicting a transition to the driven state, and/or, if the accelerator opening degree Acc is equal to or less than a predetermined prediction determination threshold value D obtained in advance for predicting a transition to the driven state.

If the driven-state transition predicting means 106 determines that the transition from the driving state to the driven state is predicted, a target drive torque replacing portion, i.e., a target drive torque replacing means 108 replaces the target drive torque $T_D^*$ (target transmission input torque $T_{AT}^*$) calculated by the hybrid control means 104 with the new target drive torque $T_D^*$ causing a transition of the vehicle state to the driven state before the engine connecting/disconnecting clutch K0 is actually put into the slip state. In this description, the target drive torque $T_D^*$ before the replacement is referred to as a pre-replacement target drive torque $T_D^*$ and the target drive torque $T_D^*$ after the replacement is referred to as a post-replacement target drive torque $T_D^*$.

Specifically, for the post-replacement target drive torque $T_D^*$, a decreasing gradient is set that is increased by a predetermined value as compared to the decreasing gradient of the pre-replacement target drive torque $T_D^*$. The decreasing gradient increased by a predetermined value is set such that, for example, even if the engine connecting/disconnecting clutch K0 is switched to the slip state after the post-replacement target drive torque $T_D^*$ turns to a negative torque, the switching start time is made earlier than the case of switching the engine connecting/disconnecting clutch K0 into the slip state when the pre-replacement target drive torque $T_D^*$ is used. Alternatively, the decreasing gradient increased by a predetermined value is set such that, even if the engine connecting/disconnecting clutch K0 is switched to the slip state in the same way as when the pre-replacement target drive torque $T_D^*$ is used, the actual switching to the slip state occurs after the post-replacement target drive torque $T_D^*$ turns to a negative torque. If the decreasing gradient increased by a predetermined value is set when the post-replacement target drive torque $T_D^*$ is shifted from a positive value to a negative value, the rattling shock and the rattling noise associated with rattling may be increased. Therefore, in a predetermined torque range including zero torque in the middle, a decreasing gradient for the post-replacement target drive torque $T_D^*$ is set equal to or less than the decreasing gradient of the pre-replacement target drive torque $T_D{}^*$, for example.

An engine torque transition predicting portion, i.e., an engine torque transition predicting means 110 determines whether it is predicted that the engine torque $T_E$ is subsequently shifted to a negative torque in the release transient process of actually putting the engine connecting/disconnecting clutch K0 into the slip state. For example, the engine torque transition predicting means 110 determines that the shift to a negative torque is predicted if a target value of the engine torque $T_E$ (target engine torque $T_E{}^*$) for acquiring the target transmission input torque $T_{AT}{}^*$ becomes lower than a predetermined prediction determination threshold value E obtained in advance for predicting a shift to a negative torque, and/or, if a decreasing gradient (decreasing rate) of the target engine torque $T_E{}^*$ is equal to or greater than a predetermined prediction determination threshold value F obtained in advance for predicting a shift to a negative torque, and/or, if a decreasing gradient (decreasing rate) of the accelerator opening degree Acc is equal to or greater than a predetermined prediction determination threshold value G obtained in advance for predicting a shift to a negative torque, and/or, if the accelerator opening degree Ace is equal to or less than a predetermined prediction determination threshold value H obtained in advance for predicting a shift to a negative torque. From another viewpoint, the engine torque transition predicting means 110 determines whether it is predicted that the engine torque $T_E$ is subsequently maintained at a positive torque in the release transient process of actually putting the engine connecting/disconnecting clutch K0 into the slip state.

If the engine torque transition predicting means 110 determines that the shift of the engine torque $T_E$ to a negative torque is predicted, a target engine torque replacing portion, i.e., a target engine torque replacing means 112 replaces the target engine torque $T_E{}^*$ calculated by the hybrid control means 104 with a target engine torque $T_E{}^*$ for maintaining a positive value. In this description, the target engine torque $T_E{}^*$ before the replacement is referred to as a pre-replacement target engine torque $T_E{}^*$ and the target engine torque $T_E{}^*$ after the replacement is referred to as a post-replacement target engine torque $T_E{}^*$. For example, a predetermined engine torque $T_E{}^*$ for maintaining a positive value obtained in advance or an engine torque $T_E{}^*$ during idling control is set as the post-replacement target engine torque $T_E{}^*$.

A driven-state transition completion determining portion, i.e., a driven-state transition completion determining means 114 determines whether the transition from the driving state to the driven state is completed, for example, based on whether the post-replacement target drive torque $T_D{}^*$ after the replacement by the target drive torque replacing means 108 turns from a positive value to a negative value.

If the driven-state transition completion determining means 114 determines that the transition from the driving state to the driven state is completed, the hybrid control means 104 controls the engine connecting/disconnecting clutch K0 toward release from a constant-pressure standby state at the predetermined torque capacity at a level not putting the engine connecting/disconnecting clutch K0 into the slip state. In the release process of the engine connecting/disconnecting clutch K0, the hybrid control means 104 may set an upper limit value for the setting value $(-T_{AT}{}^*-T_{E/K0}{}')$ of the electric motor torque $T_{MG}$ calculated based on the estimate K0-passing torque $T_{E/K0}{}'$. In other words, the electric motor torque $T_{MG}$ is guarded and made smaller than the setting value by a predetermined value.

Figure 3:
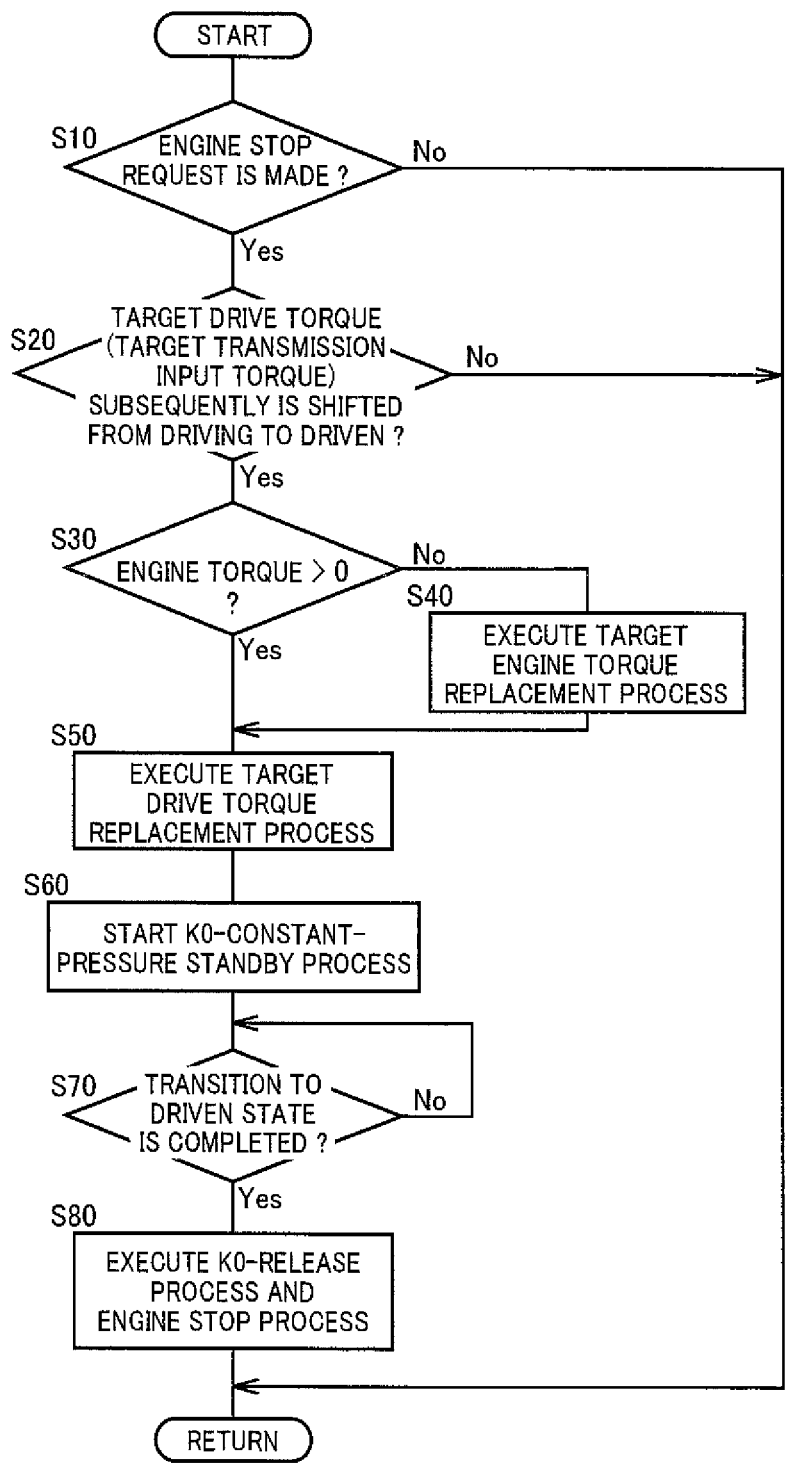
FIG. 3 is a flowchart for explaining a main portion of the control operation of the electronic control device, i.e., a control operation for suppressing the rattling noise and the rattling shock when a transition is made from the driving state to the driven state at the time of switching from the HV running to the EV running.

FIG. 3 is a flowchart for explaining a main portion of the control operation of the electronic control device 100, i.e., a control operation for suppressing the rattling noise and the rattling shock when a transition is made from the driving state to the driven state at the time of switching from the HV running to the EV running, and is repeatedly executed with an extremely short cycle time, for example, on the order of a few msec to a few tens of msec. FIG. 4 is a time chart when the control operation depicted in the flowchart of FIG. 3 is performed.

In FIG. 3, first, at step (hereinafter, step will be omitted) S10 corresponding to the hybrid control means 104, for example, it is determined whether a stop request for the engine 14 is made. If the determination at S10 is negative, this routine is terminated, and if affirmative, at S20 corresponding to the driven-state transition predicting means 106, for example, it is determined whether it is predicted that the target drive torque $T_D{}^*$ (target transmission input torque $T_{AT}{}^*$) subsequently reaches a torque causing a transition of the vehicle state from the driving state to the driven state (time t1 of FIG. 4). If the determination at S20 is negative, this routine is terminated, and if affirmative, at S30 corresponding to the engine torque transition predicting means 110, for example, it is determined whether it is predicted that the engine torque $T_E$ is subsequently maintained at a positive torque in the release transient process of actually putting the engine connecting/disconnecting clutch K0 into the slip state (time t1 of FIG. 4). If it is determined that the shift of the engine torque $T_E$ to a negative torque is predicted and the determination at S30 is negative, at S40 corresponding to the target engine torque replacing means 112, the target engine torque $T_E{}^*$ is replaced with a target engine torque $T_E{}^*$ maintaining a positive value. If the determination at S30 is affirmative, or after S40, at S50 corresponding to the target drive torque replacing means 108, the target drive torque $T_D{}^*$ (target transmission input torque $T_{AT}{}^*$) is replaced with a target drive torque $T_D{}^*$ causing a transition of the vehicle state to the driven state before the engine connecting/disconnecting clutch K0 is actually put into the slip state (after time t1 of FIG. 4). For the post-replacement target drive torque $T_D{}^*$, a decreasing gradient is set that is increased by a predetermined value as compared to the decreasing gradient of the pre-replacement target drive torque $T_D{}^*$; however, in a predetermined torque range including zero torque in the middle, a decreasing gradient for the post-replacement target drive torque $T_D{}^*$ may be set to be equal to or less than the decreasing gradient of the pre-replacement target drive torque $T_D{}^*$. In other words, when a transition is made from the driving state to the driven state, a torque change rate of the target drive torque $T_D{}^*$ may be made smaller to suppress the rattling shock and the rattling noise. At S60 corresponding to the hybrid control means 104, the K0-clutch torque $T_{K0}$ is reduced to a predetermined torque capacity at a level not putting the engine connecting/disconnecting clutch K0 into the slip state as needed for the constant-pressure standby so as not to delay the release of the engine connecting/disconnecting clutch K0 (time t 1 to time t3 of FIG. 4). At S70 corresponding to the driven-state transition completion determining means 114, it is determined whether the transition from the driving state to the driven state is completed. If the determination at S70 is negative, S70 is repeatedly executed, and if affirmative, at S80 corresponding to the hybrid control means 104, the engine connecting/disconnecting clutch K0 is controlled toward release from the constant-pressure standby state at the predetermined torque capacity (after time t3 of FIG. 4). After the release of the engine connecting/disconnecting clutch K0, a fuel cut of the engine 14 is performed to stop the engine 14 (after time t3 of FIG. 4). In the release process of the engine connecting/disconnecting clutch K0, the setting value $(=T_{AT}{}^*-T_{E/K0}{}')$ of the electric motor torque $T_{MG}$ calculated based on the estimate K0-passing torque $T_{E/K0}'$ may be limited by an upper limit value so as not to cause the driving state again.

Figure 4:
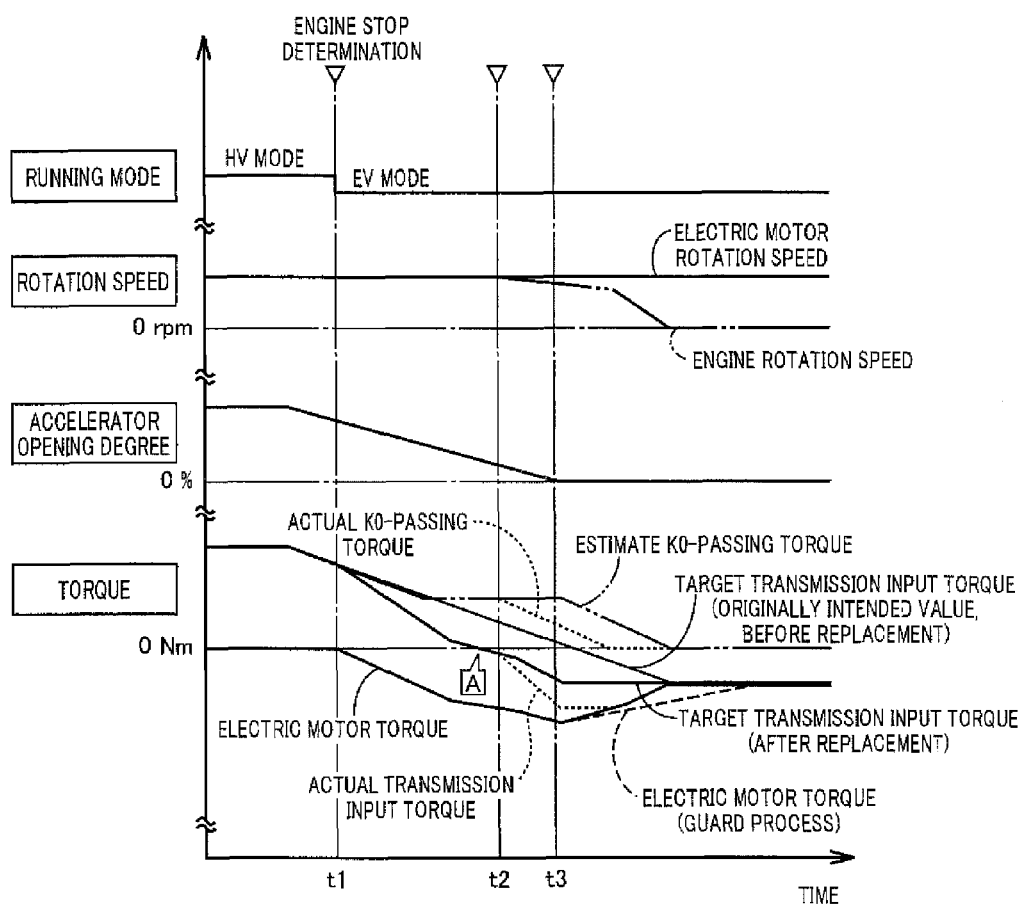
FIG. 4 is a time chart when the control operation depicted in the flowchart of FIG. 3 is performed.

In FIG. 4, when the accelerator pedal 76 is operated toward turning off of acceleration (accelerator opening degree Acc=zero determination value) during the HV running and the engine stop determination is made at time t 1, if the transition of the vehicle state is considered to be made from the driving state to the driven state (time t1), a pre-replacement target transmission input torque $T_{AT}^*$ (thin solid line) is set to a post-replacement target transmission input torque $T_{AT}^*$ (bold solid line) so that the target transmission input torque $T_{AT}^*$ is corrected to make a shift to the driven side earlier (after time t1). Therefore, before time t2 at which the engine connecting/disconnecting clutch K0 is actually put into the slip state, the actual transmission input torque $T_{AT}$ (broken line) is already within the range on the driven side (i.e., the gears in the drive system are already meshed on the driven side). Therefore, even if the actual K0-passing torque $T_{E/K0}$ (broken line) gradually decreases earlier than the estimate K0-passing torque $T_{E/K0}'$ (dashed-two dotted line) and the actual transmission input torque $T_{AT}$ is reduced at a steeper gradient than the post-replacement target transmission input torque $T_{AT}^*$ (after time t2), the rattling noise and the rattling shock are not generated.

When the transition is made from the driving state to the driven state, the engine connecting/disconnecting clutch K0 is still engaged and the actual transmission input torque $T_{AT}$ can be estimated/controlled with the electric motor torque $T_{MG}$ and the engine torque $T_E$ that can relatively accurately be estimated (controlled). Therefore, this facilitates the setting of the post-replacement target transmission input torque $T_{AT}^*$ such that the actual transmission input torque $T_{AT}$ is slowly changed before gaps between the gears in the drive system are changed to a closed state on the driven side, i.e., the addition of a process of slowly changing the actual transmission input torque $T_{AT}$ in the transition process from the driving state to the driven state (see a portion A of FIG. 4).

If the engine torque $T_E$ is negative in the release process of the engine connecting/disconnecting clutch K0, the K0-passing torque $T_{E/K0}$ is increased (negative torque is reduced) and, therefore, a transition of the actual transmission input torque $T_{AT}$ may be made again from the driven side to the driving side. In this regard, in the release process of the engine connecting/disconnecting clutch K0 when the engine 14 is stopped, this problem can be avoided by maintaining the engine torque $T_E$ at a positive value.

If the actual K0-passing torque $T_{E/K0}$ gradually decreases later than the estimate K0-passing torque $T_{E/K0}'$, the actual transmission input torque $T_{AT}$ becomes larger than the post-replacement target transmission input torque $T_{AT}^*$ and, therefore, a transition of the actual transmission input torque $T_{AT}$ may be made again from the driven side to the driving side. In this regard, in the release process of the engine connecting/disconnecting clutch K0, this problem can be avoided by limiting the electric motor torque $T_{MG}$ with the upper limit value for providing a guard process (see a broken line with a longer segment of FIG. 4).

As described above, according to this example, if a transition of the vehicle state (drive system) is made from the driving state to the driven state at the time of switching from the HV running to the EV running, the transition of the vehicle state to the driven state is made before the engine connecting/disconnecting clutch K0 is actually put into the slip state and, therefore, when the engine connecting/disconnecting clutch K0 is actually put into the slip state and the actual K0-passing torque $T_{E/K0}$ decreases, the drive system is already put into the driven state (i.e., a gap in a meshing portion between gears in the drive system is changed to the closed state on the driven side). Thus, even if the actual K0-passing torque $T_{E/K0}$ is reduced earlier than assumed (earlier than the estimate K0-passing torque $T_{E/K0}'$) and the actual drive torque $T_D$ (actual transmission input torque $T_{AT}$) is reduced at a steeper gradient than the post-replacement target drive torque $T_D^*$ (post-replacement target transmission input torque $T_{AT}^*$), the rattling noise and the rattling shock are not generated. Since the engine connecting/disconnecting clutch K0 is still in the engaged state when the transition is made from the driving state to the driven state, the electric motor torque $T_{MG}$ is accurately slowly changed when the drive torque $T_D$ is changed from a positive torque to a negative torque, as compared to the case of slowly changing the electric motor torque $T_{MG}$ while the engine connecting/disconnecting clutch K0 is put into the slip state. Therefore, the rattling noise and the rattling shock can be suppressed.

According to this example, since the target drive torque $T_D^*$ (target transmission input torque $T_{AT}^*$) is set to a torque causing a transition of the vehicle state to the driven state before the engine connecting/disconnecting clutch K0 is actually put into the slip state, the transition can properly be made from the driving state to the driven state with the electric motor torque $T_{MG}$ that can relatively accurately be estimated, before the engine connecting/disconnecting clutch K0 is put into the slip state.

According to this example, since the engine torque $T_E$ is maintained at a positive torque in the release transient process of releasing the engine connecting/disconnecting clutch K0, the transition of the vehicle state is prevented from occurring again from the driven state to the driving state. Therefore, the rattling noise and the rattling shock can be prevented from occurring due to the transition from the driven state to the driving state.

According to this example, since the electric motor torque $T_{MG}$ is controlled to maintain the vehicle state in the driven state in the release transient process of releasing the engine connecting/disconnecting clutch K0, even if the actual K0-passing torque $T_{E/K0}$ varies differently from the assumption (e.g., even if gradually decreasing later than the estimate K0-passing torque $T_{E/K0}'$), the transition of the vehicle state is prevented from occurring again from the driven state to the driving state. Therefore, the rattling noise and the rattling shock can be prevented from occurring due to the transition from the driven state to the driving state.

Although the example of the present invention has been described in detail with reference to the drawings, the present invention is also applied in other forms.

For example, in the example, if it is predicted that the engine torque $T_E$ is shifted to a negative torque in the release transient process of releasing the engine connecting/disconnecting clutch K0, the target engine torque $T_E^*$ is replaced with a target engine torque $T_E^*$ maintaining a positive value; however, if the engine torque $T_E$ turns to a negative value in the release transient process of releasing the engine connecting/disconnecting clutch K0, i.e., if the K0-passing torque $T_{E/K0}$ turns to a negative value, the control of making a transition to the driven state (control of replacing the target transmission input torque $T_{AT}^*$) may not be provided before the engine connecting/disconnecting clutch K0 is put into the slip state. In other words, in the flowchart of FIG. 3, if it is determined that the shift of the engine torque $T_E$ to a negative torque is predicted and the determination at S30 is negative in the flowchart of FIG. 3, this routine may be terminated instead of executing 540. As a result, while the provision of the control of replacing the target transmission input torque $T_{AT}^*$ may increase the K0-passing torque $T_{E/K0}$ (i.e., reduce the negative torque) and cause a new problem of making a transition of the vehicle state (drive system) again from the driven state to the driving state, the occurrence of the new problem is avoided because the control is not provided.

Although the engagement devices engaged for forming a shift stage of the automatic transmission 18 are hydraulic friction engagement devices such as the clutches C and the brakes B in the example, this is not a limitation and the engagement devices may be other engagement devices of the electromagnetic type, the magnetic particle type, etc., such as electromagnetic clutches, powder (magnetic particle) clutches, and meshing-type dog clutches, for example. Although the automatic transmission 18 is an automatic transmission subjected to the shift control to a shift stage determined based on a running state from a shift map, this is not a limitation and the transmission may be a manual transmission shifted to a shift stage based only on a driver's operation, for example.

Although the target drive torque $T_D^*$ can be the transmission output torque $T_{OUT}$, the transmission input torque $T_{AT}$, the input torque of the power transmission device 12, etc., that can be converted from the target drive torque $T_D^*$ calculated based on the accelerator opening degree Acc and the vehicle speed V in the example, this is not necessarily a limitation. For example, the target drive torque $T_D^*$ can be the transmission output torque $T_{OUT}$, the transmission input torque $T_{AT}$, etc., converted from the required engine torque $T_E$ calculated based on the accelerator opening degree Acc.

Although the torque converter 16 is used as a hydraulic transmission device in the example, the torque converter 16 may not necessarily be disposed and another hydraulic transmission device such as a fluid coupling without a torque amplification effect may be used instead of the torque converter 16.

The description is merely an embodiment and the present invention may be implemented in variously modified and improved forms based on the knowledge of those skilled in the art.

Description of Reference Numerals

10: hybrid vehicle 14: engine (drive power source for running) 18: automatic transmission 34: drive wheel 100: electric control device (control device) K0: engine connecting/disconnecting clutch (clutch) MG: electric motor (drive power source for running)

The invention claimed is:

1. A control device of a hybrid vehicle including an engine and an electric motor as a drive power source for running, a clutch connecting/disconnecting a power transmission path between the engine and the electric motor, and an automatic transmission coupled to the electric motor in a power transmittable manner to transmit power from the drive power source for running toward drive wheels, the hybrid vehicle being configured to perform engine running using at least the engine as the drive power source for running with the clutch engaged and motor running using only the electric motor as the drive power source for running with the clutch released, the control device being configured such that when the engine running is switched to the motor running, if a transition is made from a driving state in which a drive torque is a positive torque to a driven state in which the drive torque is a negative torque, the transition to the driven state is made before the clutch is put into a slip state.

2. The control device of a hybrid vehicle of claim 1, wherein an output torque of the electric motor is controlled-based on an estimate value of a passing torque so as to realize a target value of a combined torque of the passing torque and the output torque of the electric motor, wherein the passing torque is an output torque of the engine passing through the clutch toward the automatic transmission, and wherein, the target value of the combined torque is set to a torque causing a transition to the driven state before the cultch is put into the slip state.

3. The control device of a hybrid vehicle of claim 1, wherein the output torque of the engine is maintained at a positive torque in a release transient process of releasing the clutch.

4. The control device of a hybrid vehicle of claim 1, wherein the output torque of the electric motor is controlled to maintain the driven state in a release transient process of releasing the clutch.

5. The control device of a hybrid vehicle of claim 2, wherein if the passing torque turns to a negative torque, the control device cancels controlling to make a transition to the driven state before the clutch is put into the slip state.

* * * * *